United States Patent
Mittal et al.

(10) Patent No.: US 9,426,535 B2
(45) Date of Patent: Aug. 23, 2016

(54) SYNCHRONIZATION ALGORITHM FOR DATA STREAMING BY PROXY SERVER THROUGH ASYNCHRONOUS MULTICAST CHANNEL

(71) Applicant: VERIZON PATENT AND LICENSING INC., Basking Ridge, NJ (US)

(72) Inventors: Richa Mittal, New Delhi (IN); Padmakumar Rajan, Chennai (IN)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 97 days.

(21) Appl. No.: 14/135,698

(22) Filed: Dec. 20, 2013

(65) Prior Publication Data
US 2015/0181260 A1    Jun. 25, 2015

(51) Int. Cl.
*H04N 21/235* (2011.01)
*H04N 21/482* (2011.01)
*H04N 21/6405* (2011.01)
*H04N 21/262* (2011.01)

(52) U.S. Cl.
CPC .... *H04N 21/6405* (2013.01); *H04N 21/26283* (2013.01)

(58) Field of Classification Search
CPC .............. H04N 21/266; H04N 21/44209; H04N 21/27; H04N 21/2362; H04N 21/2221; H04N 21/472; H04N 21/25866; H04N 21/242

USPC ................................. 725/39, 54–56
See application file for complete search history.

(56) References Cited

U.S. PATENT DOCUMENTS

| | | | |
|---|---|---|---|
| 2001/0014976 A1* | 8/2001 | Roop et al. ..................... 725/91 |
| 2002/0049972 A1* | 4/2002 | Kimoto .............. H04N 5/44543 725/39 |
| 2003/0149979 A1* | 8/2003 | Baldwin et al. ................ 725/39 |
| 2003/0217365 A1* | 11/2003 | Caputo .......................... 725/95 |
| 2008/0256575 A1* | 10/2008 | Raju et al. ...................... 725/39 |
| 2010/0299404 A1* | 11/2010 | Gonder ................ H04N 21/235 709/217 |

* cited by examiner

*Primary Examiner* — Brian T Pendleton
*Assistant Examiner* — Alan Luong

(57) ABSTRACT

A guide data server stores program guide content in a memory and transmits the stored content to a multicast server. The multicast server transmits the received content to set top boxes according to three independent time periods. The three time periods include an update blocking time period, a multicast blocking time period, and a normal time period. During the update blocking time period, the multicast server transmits old program guide content to the set top boxes. During the multicast blocking time period, the multicast server (1) performs a one-time request for the new program guide content from the guide data server, and (2) receives new program guide content from the guide data server. During the normal time period, the multicast server receives new program guide content transmitted from the guide data server and transmits the new program guide content to the set top boxes.

20 Claims, 5 Drawing Sheets

| Multicast Server Blocking Times (non-daylight savings time (non-DST)) | | | |
|---|---|---|---|
| Name of Time Period | Time period in which content is downloaded | Frequency that Multicast Server checks Guide Data Server for updates of content | Multicast Server downloads content from Guide Data Server |
| Normal Operating Hours | 2:10 a.m. to 11:54 p.m. | Every X minutes | If content within Guide Data server has been modified |
| Update Blocking Time Period | 11:55 p.m. to 1:49 a.m. | Only at Multicast Server Startup | Only at Multicast Server startup, if the server doesn't contain the data |
| Multicast Blocking Time Period | 1:50 a.m. to 2:09 a.m. | At the start of the time slot (e.g., 1:50 a.m.) and then every X minutes thereafter | Forcefully the first time; then if content within Guide Data server has been modified |

202 — Normal Operating Hours row
204 — Update Blocking Time Period row
206 — Multicast Blocking Time Period row

FIG. 2A

| Multicast Server Blocking Times (daylight savings time (DST)) | | | |
|---|---|---|---|
| Name of Time Period | Time Slot in which content is downloaded | Frequency that Multicast Server checks Guide Data Server for updates of content | Multicast Server downloads content from Guide Data Server |
| Normal Operating Hours | 3:10 a.m. to 11:54 p.m. | Every X minutes | If content within Guide Data server has been modified |
| Update Blocking Time Period | 11:55 p.m. to 2:49 a.m. | Only at Multicast Server Startup | Only at Multicast Server startup, if the server doesn't contain the data |
| Multicast Blocking Time Period | 2:50 a.m. to 3:09 a.m. | At the start of the time slot (e.g., 2:50 a.m.) and then every X minutes thereafter | Forcefully the first time; then if content within Guide Data server has been modified |

FIG. 2B

SYNCHRONIZATION ALGORITHM FOR DATA STREAMING BY PROXY SERVER THROUGH ASYNCHRONOUS MULTICAST CHANNEL

BACKGROUND

A set-top box (STB) is an information device that typically contains a tuner and connects a television set to an external signal source. The STB converts the signal source into content, and the content can be displayed on a display device, e.g., a television screen. STBs may provide non-interactive content (e.g., television programs, menus for television programs, etc.), as well as interactive content (e.g., games and social network sites) to a user. An STB may be used in cable television and satellite television systems, as well as other technologies.

An STB may also receive content from a content server, for example, for an interactive program guide service. In an example, the STB requests program guide content from the content server using an HTTP request. In some examples, STBs requesting program guide content from a content server may follow a pull framework, like that of HTTP, in which each client side device requests a content service and the server services each request by transmitting a response with the requested content. Alternatively, a content server may follow the push framework, in which the server sends the program guide content, for example, to the client side device(s) on the server's schedule without specific requests by the client(s). Where multiple devices may receive the same program guide content at about the same time, the server may also be able to multicast the appropriate content to some number of the devices, without necessarily requiring separate individual point to point transmissions. Much bandwidth may be preserved when using the push framework, rather than the pull framework, because the push framework decreases many of the content requests from the STB to the content server. In contrast, pull systems may consume high bandwidth, because many STBs may exist, and each of the many STBs is required to perform multiple requests for program guide content from the content server.

BRIEF DESCRIPTION OF DRAWINGS

The drawing figures depict one or more implementations in accord with the present teachings, by way of example only, not by way of limitation. In the figures, like reference numerals refer to the same or similar elements.

FIGS. 2A, 2B are tables depicting independent time periods in which multicast server downloads content from guide data server.

DETAILED DESCRIPTION

Figure 1:
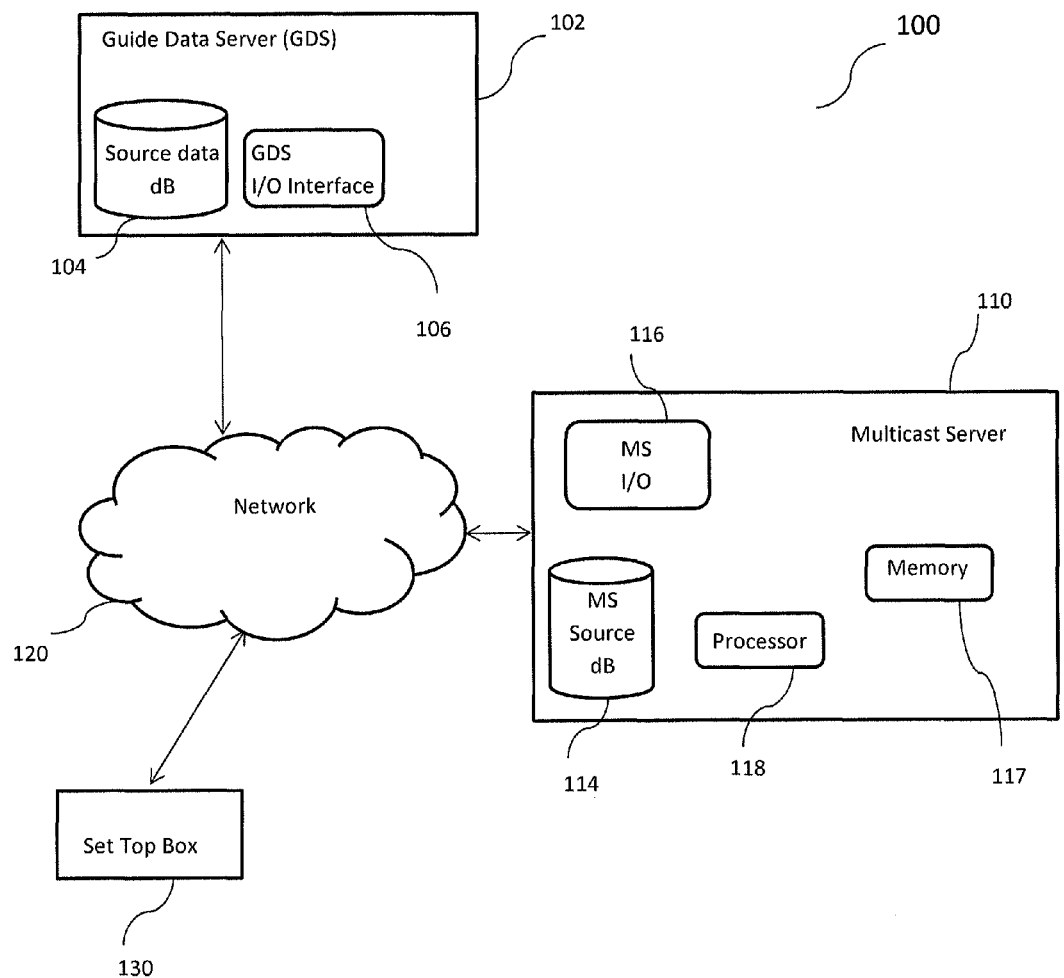
FIG. 1 is a high-level functional block diagram of an example guide data server (GDS), as an example of a content server, communicating with a multicast server (MS) to provide content to set top boxes (STB) via a network using a push framework.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Watching television, or other media, on a display (e.g., a television screen) is an increasingly popular pastime. To increase a user's satisfaction while watching television, and such, menus have been implemented that display information relating to the television programs on the television screen. One example of a menu that is displayed on television screens is known as an electronic program guide (EPG). An EPG provides users of television, as well as radio and other media applications, with continuously updated menus displaying broadcast programming or scheduling information. The menus may relate to current and upcoming programming.

Particular types of EPGs, sometimes referred to as interactive program guides (IPGs), allow television viewers to interactively navigate scheduling menus. IPGs enable users to identify and select programming by time, title, station, genre, etc. Users can select the programming using an input device, such as a keypad, computer keyboard, or TV remote control. Interactive menus of the IPG may be generated using scheduling data sent by content providers, sometimes known as centralized scheduling information providers. For purposes of this disclosure, the systems configured to operate as EPG type content providers may be referred to as guide data servers, although content providers may also be known, or implemented, in other form factors. A content provider (e.g., guide data server in our example) typically provides IPG information to users for programs that will be shown in the future. For example, rather than providing the data to the STB at the time of a user request, many systems provide downloads of 7 to 14 days of guide data for advance storage in the STB. Upon a local user request for program guide information, the STB locally processes and presents the appropriate guide content based on stored data. In examples, IPGs may display channel names and program titles/times via a grid or table. IPG interfaces may also allow a user to highlight any given listing and retrieve additional information about the highlighted listing.

A concept described in this disclosure relates to timely updating a proxy server (e.g., multicast server) that provides the content data to the STBs. In examples, the multicast server may be updated with program guide content. The multicast server may thereafter download the program guide content to storage in set top boxes (STBs), using the push framework. Another concept embodied in examples described below relates to ensuring that the multicast server is updated correctly, e.g. when the multicast server and the guide data server are located in different time zones. This concept will also be relevant for circumstances where the multicast server is catering to set top boxes located across multiple time zones.

The multicast server, in several of the examples, pushes content to set top boxes for storage therein at a particular time. Before the push transmission, however, the multicast server obtains the content from the ultimate content source, for example, using a pull type request and response communication with the source (the guide data server in program guide examples). With the timing of the request for content from the source, the multicast server can effectively control the time of its receipt of content from the source in relation to the push transmission to the set top boxes.

A computer, or the like, running a server program is often itself referred to as a server, a server computer, or a server platform. Conversely, another computer, or the like, that runs a client program for consuming the particular service offered by a server is often itself referred to as a client, a client computer, or a client device. A server is typically implemented as a server application program running on the computer, or other platform, that is to be configured to offer the service. The client, in contrast, is typically implemented as a client application program running on the device that is to be configured to consume the service. In many cases, the client applications run on end users' equipment, such as terminals, mobile devices or STBs, that communicate via a network with the computer(s) running the server program. For some purposes, however, a client and server may run in the same device. A device that is a server for one purpose may be a client of another server for other purposes. For convenience, the description that follows may often use the term server (e.g., for a guide data server, a multicast server, etc.) to broadly represent a data processing device used to run the applicable server programming. Such devices typically utilize general purpose computer hardware with appropriate network communication capabilities, to perform server processing and to perform attendant communications via one or more networks. The hardware elements of such server computers are conventional in nature.

FIG. 1 shows a simplified example of a network 120 for transmitting program guide content among guide data server 102, multicast server 110, and STB 130. The network 120 may also facilitate similar communications for many other devices, and may be implemented by a number of interconnected networks, or a single network. Although there may be any number of STBs servicing the system 100, the illustration shows only one such device. System 100 includes a guide data server 102, multicast server 110, and at least one STB 130 connected for communication via a network 120. The devices, components, etc. depicted on FIG. 1 illustrate only one example of system 100. Many other examples in line with the concept described herein may exist, including, for example, having multiple guide data servers 102, multiple multicast servers 110, multiple networks 120, multiple STBs 130, etc. System 100 may also include other devices and components, not shown in FIG. 1, for providing program guide content from a content provider to one or more STBs. The discussion of the examples focuses on the program guide content distribution. For convenience, elements for transmitting and transporting video, audio, or other programming (e.g. as referenced in the guide) over a network to the STBs are omitted.

System 100 includes a number of STBs. An STB 130 is a consumer device that receives content, including IPG content, and other program guide content, from a guide data server 102 (or from a proxy to guide data server 102). The STB provides the program guide content to a television display (not shown), or other device, so that the user can easily view the IPG content, for example, on the display. In a consumer application, the STB 130 will also provide video, audio and other content for output to the user, e.g. via the television, etc.

As indicated above, guide data server 102 is one example of a device/source providing program guide content, including interactive program guide (IPG) content, to the STB 130. Guide data server 102 may store IPG content in one or more source data databases 104. GDS I/O Interface 106 may transmit the program guide content to STB 130 via network 120. In some system configurations, the guide data server 102 may provide the IPG content to the STB 130 directly. Guide data server 102 transmits the multimedia content, including IPG content, to STB (or other device) via GDS I/O Interface 106.

In the examples under consideration in this disclosure, the guide data server 102 provides the IPG content to the STB 130 via one or more proxy servers (e.g., multicast server 110). In general, a proxy server is a networking element which acts as an intermediary between a client (e.g., STB 130) and a server (e.g., GDS 102). Although the proxy server may process requests in a variety of ways, at a high level the proxy server obtains the requested service (e.g. program guide content) from the actual service-providing server and provides the service (program guide content in our example) to the client. Multicast server 110, in these examples, receives content from guide data server 102 so that multicast server 110 can transmit the content to STB 130 via the push, or another, framework. The push framework may be used in examples because it reduces bandwidth within system 100, because this framework does not require the client (e.g., STB 130) to make repeated requests for information.

In one example, multicast server 110 includes a MS I/O Interface 116, a storage device storing a database 114, and processor and possibly other memory 117. The MS I/O Interface 116 is a device that receives the program guide content from the guide data server 102, and/or sends the content to the STB 130, in accordance with the particular networking technologies used to implement the content delivery service. Multicast server 110 stores IPG content, as well as other information, in MS Source database 114. At least one processor 118 is located on multicast server 110. Processor 118 is used to transfer content between the MS I/O Interface 116 and the MS Source database 114, as well as to perform other functions. For example, processor 118 may be used for searching information stored in MS Source database 114, transferring IPG content from MS Source database 114 to memory 117.

With an arrangement or system, like system 100, there are two operations in which content is moved. One operation is to provide content from server 102 for storage in server 110, and another operation is to distribute instances of some or all of the content from storage in the server 110 to storage in some number of the STBs like 130. Both of these content transfers may entail timing considerations, for example, to time transfers in such a way that the multicast server 110 has the most recent/complete set of program guide content to supply to the STB 130 at the time of a multicast push to the STBs.

The multicast server 110 can use time to control operations to obtain content from the guide data server 102, for example, according to a schedule. Operations of the multicast server 110 for pushing data to STBs can also be controlled by a schedule. Examples of these schedules and coordination thereof are discussed in more detail below.

Multicast server 110 may transmit new program guide content to STB 130 at predefined times of day. Multicast server 110, for example, may transmit new program data to STB 130 starting at 2:10 a.m. To transmit the new program data to STB 130 at 2:10 a.m., the multicast server should already contain the new program data. Thus, in the example in which multicast server 110 transmits the program data to STB 130 at 2:10, multicast server 110 should begin downloading the program content from the guide data server 102 prior to 2:10 a.m. In examples in which the download of content from guide data server takes approximately 20 minutes, and transmissions to STBs is scheduled to begin at 2:10 a. m., the download from the guide data server might begin at or before 1:50 a.m. After multicast server 110 downloads the program content from the guide data server 102, the transmission of program data from multicast server 110 to STB 130 is typically referred to as a content refresh. Content refresh, in these examples, is a method in which outdated content previously received and stored within the STB 130 is replaced with updated content (in preferred examples, as newly provided by multicast server 110). Although the disclosure describes content refresh occurring at 2:10 a.m., this is only one example. Content refresh may occur at any time, or times, of day, day of the week, etc.

In examples in which content refresh occurs at 2:10 a.m., content transmitted from multicast server 110 to STB 130 at this time may include content for that date, as well as content for some number of subsequent dates. For example, content being transmitted to STB 130 on September $25^{th}$ may include content corresponding to September $25^{th}$, as well as content corresponding to seven days beyond September $25^{th}$. Note, however, that the time of content refresh (i.e., 2:10 a.m. in this example), the duration of content provided during content refresh (i.e., seven days in this example), as well as other variables, are provided for illustration purposes only, and are not meant to be limiting. Thus, any day, time of day, duration of content, etc., may be used for content refresh and/or the data communicated to the STBs in a refresh operation. Further, as described below, the time for content refresh, and other times, may be moved one hour during daylight savings time. For example, content refresh that typically occurs at 2:10 a.m. may occur an hour later, e.g., 3:10 a.m., during daylight savings time.

Multicast server 110 may transmit program guide content to STB 130, and receive program guide content from GDS 102, according to periods of time (e.g., normal operating hours, multicast blocking time period, and update blocking time period). In the multicast blocking time period, multicasting from multicast server 110 to STB 130 is blocked. In the update blocking time period, multicast server 110 may refrain from downloading new content from GDS 102 (except for error-handling). (The multicast blocking and update blocking time periods are described further below with respect to FIGS. 2A and 2B.) Multicast server 110 and STB 130, however, may transmit program guide content according to more, or less, than these three periods of time. Further, in one example, each of these time periods may be separate and independent of one another. In other examples, however, each of these time periods may overlap upon at least one of the other time periods.

FIGS. 2A, 2B include tables depicting different times in which program guide content is transmitted among guide data server 102, multicast server 110, network 120, and STB 130, according to one example illustrating update blocking time period, multicast blocking time period, and normal operating hours. Standard message sequences found within these three periods of time, for purposes of the disclosure, may be defined as requiring no error-handling when transmitting messages among the devices. Error handling may be necessary, for example, if one, or more than one, of the devices (e.g., GDS 102, MS 110, STB 130) are activated (e.g., powered up, restarted, etc.) during the one of the time periods. The examples may provide an algorithm to handle error processing if one or more of the devices are activated, or the like, during a relevant time period (e.g., update blocking time period, multicast blocking time period, and/or normal operating hours).

FIGS. 2A and 2B depict begin times and end times for the three relevant time periods according to the examples discussed herein. The three relevant time periods, as well as other time periods according to examples described in this disclosure, may include begin times and end times that differ from those shown in FIGS. 2A and 2B. As indicated above, the time periods may include normal operating hours 202, 212, an update blocking time period 204, 214, and a multicast blocking time period 206, 216. FIGS. 2A and 2B show the begin times and end times for the normal operating hours 202, 212, update blocking time period 204, 214, and multicast blocking time periods 206, 216. FIG. 2A depicts the begin times and end times for each time period when daylight savings time is not applicable. In addition, FIG. 2B depicts the begin times and end times for each respective time period when daylight savings time is applicable. Begin times and end times for the three time periods, both with and without daylight savings time considerations, will be discussed further below.

Generally, in the illustrated example, the time period of normal operating hours (202 for non-daylight savings time and, 212 for daylight savings time) may be defined as the time period between 2:10 a.m. and 11:54 p.m. (non-DST). During normal operating hours, guide data server 102 provides new content (i.e., updated content for the present day and a predefined number of days thereafter) to multicast server 110. In examples, as described above, the multicast server 110 transmits, by multicast transmission, the latest guide content data over the network 120 to the STBs during normal operating hours each day. Normal operating hours (non-DST) is scheduled after content refresh, e.g., from 2:10 a.m. to 11:54 p.m. Thus, the STB 130 typically contains the most up-to-date content after content refresh.

System 100 may also account for daylight savings time (DST). During DST, for example, the begin time of normal operating hours, as well as other relevant time periods, may be one hour later than during non-DST. As described further below, although the time periods may differ depending on the occurrence of non-DST and DST, the transmission of content among the devices and within each respective time period (e.g., normal operating hours, update blocking time period, multicast blocking time period) remains the same, irrespective of whether the time is DST or non-DST.

As shown on FIGS. 2A and 2B, during normal operating hours multicast server 110 searches guide data server (GDS) 102 for updates of new content. For this searching and related downloading of updates, the multicast server 110 may act as a "client" with respect to the GDS "server" 102. In one example, multicast server 110 searches guide data server 102 during normal operating hours for content updates on a periodic basis. Multicast server 110, for example, may search guide data server 102 for updates of new content every x-minutes, y-hours, z-days, etc., as well as according to any other periodic or irregular timing schedule. Alternatively, or additionally, multicast server 110 may search guide data server 102 at one or more times of day during normal operating hours, may search guide data server 102 in response to a user interaction, etc. In one example, when multicast server 110 determines, during normal operating hours, that updates are available from its search, multicast server 110 may download the updated new content, e.g., via a download request from the server 110. Multicast server 110 may store the downloaded new content in MS source database 114, or another device used for storing content. The stored new content may thereafter be transmitted to STB 130 according to the push framework, as well as any other known framework for sending messages among devices. In some examples, multicast server 110 may check for updates in the GDS 102 by using an HTTP HEAD request. Multicast server 110 may send an HTTP request to GDS 102. When multicast server 110 receives a response to the HTTP request (from GDS 102), multicast server 110 examines the current timestamp received in the response, to identify whether the current timestamp is updated (i.e., modified) compared to a previous timestamp received with a previous guide data download. If the current timestamp is modified, the multicast server 110 determines that updates are available.

As indicated above, in one example, normal operating hours may begin at 2:10 a.m. and end at 11:54 p.m. In this example, update blocking time period may begin at 11:55 p.m. and end at 1:49 a.m., and multicast blocking time period may begin at 1:50 a.m. and end at 2:09 a.m. Other examples, however, may include update blocking time period, normal operating hours, and multicast blocking time period beginning and ending at times different than described above (e.g., prior to content refresh at 2:10 a.m.).

Update blocking time period may be scheduled prior to content refresh. In some examples, multicast server 110 may refrain from downloading any new content from guide data server 102 during update blocking time period 204, 214, unless error-handling is required. Examples of error handling may include multicast server 110 being activated, restarted, etc. In this example, because multicast server 110 does not download content during standard processing within update blocking time period 204, 214, multicast server 110 may refrain from checking the guide data server 102 for content updates during standard processing of this time period. Multicast server 110 may refrain from checking the guide data server 102 for program guide content updates during blocking times (e.g., update blocking time period, multicast blocking time period) so that the program guide content stored in multicast server 110 can remain in sync with the program guide data stored in STB 130. Because multicast server 110 refrains from checking guide data server 102 for updated content, in this example, multicast server 110 may stream old content to STBs 130 during standard processing within update blocking time period 204, 214.

Alternatively, as described in FIGS. 2A, 2B, when error-handling is required during update blocking time period 204, 214 (e.g., the STB 130 is activated, restarted, etc. during update blocking time period), multicast server 110 (and/or other devices) may determine the status of the content that multicast server 110 is storing. In one example, the status of the content may be the date and/or time of day that the content was received, modified, or stored on guide data server 102. For instance, a multicast server 110 activated for the first time during the update blocking time period 204, 214, may contain no content (i.e., status of no content present). Alternatively, a multicast server 110 activated during the update blocking time period 204, 214 may contain content that the server 110 received prior to being deactivated (i.e., status of content present, as well as time/date stamp of the content that is present).

If it is determined during update blocking time period that multicast server 110 does not contain any content from guide data server 102 (e.g., if multicast server 110 is activated for the first time), multicast server 110 may request from guide data server 102 a download of old content (e.g., content that guide data server 102 had published the previous day). Alternatively, if multicast server 110 is activated during update blocking time period and it is determined that multicast server 110 contains content that is less up-to-date than the content contained in guide data server 102, multicast server 110 may request the more up-to-date content from guide data server 102. Thus, in at least one example, multicast server 110 may download content from guide data server 102 during update blocking time period, particularly if the multicast server 110 is activated and the content stored within the guide data server 102 is more up-to-date than the content stored within multicast server 110.

A third time period, i.e., multicast blocking time period 206, 216, may also exist according to aspects described in this disclosure. In an example, shown in FIGS. 2A, 2B, multicast blocking time period 206, 216 may begin at 1:50 a.m. and end at 2:09 a.m. (for non-DST). As indicated above, content refresh may occur at 2:10 a.m. In the example in which content refresh occurs at 2:10 a.m., content refresh occurs after the multicast blocking time period. In other examples, however, content refresh may occur prior to 2:10 a.m. (e.g., 2 a.m.). In these examples, content refresh may occur during multicast blocking time period.

As illustrated on FIGS. 2A, 2B, during multicast blocking time period 206, 216, and more particularly during standard processing within multicast blocking time period, multicast server 110 requests new content from guide data server 102. In multicast blocking time period 206, 216, content from the GDS 102 is downloaded forcefully the first time (i.e., files are updated without checking for updates explicitly on the GDS 102). In one example, this request from multicast server 110 to guide data server 102 may be a one-time download request for new content. In other examples, however, multicast server 110 may request new data from guide data server 102 multiple times, e.g., according to a particular schedule. For example, according to the schedule, new guide data may be requested from the guide data server 102 at predetermined periodic intervals or at predetermined times. As indicated above, the new content downloaded from guide data server 102 may include eight days of content, including content for the current day. Or, the new content downloaded may include more, or less, than eight days of content. Using this example, multicast server 110 may receive new content for the current date, as well as days (e.g. 7 or 14 days) in the future. Normally, multicast server 110 may modify its content only when it determines that guide data server 102 has more up-to-date content than what is presently stored on multicast server 110. At the start of the multicast blocking time period 206, 216, however, multicast server 110 may initiate a download request (i.e., the one-time download request) to guide data server 102 for new data (regardless of the present content stored on multicast server 110. The one-time download is, therefore, referred to as being "forcefully" downloaded.

During multicast blocking time period 206, 216, but after the above-mentioned download request, multicast server 110 may determine if guide data server 102 contains content that is more up-to-date than the content stored in multicast server 110. Thus, in one example, multicast server 110 may determine if the content stored on the guide data server 102 is more up-to-date than the content the multicast server had received from guide data server 102 during the above-mentioned download request. This determination may be based on a time, schedule etc. In this example, if multicast server 110 determines that the content stored within guide data server 102 is more up-to-date than content stored within the multicast server 110, multicast server 110 requests the more up-to-date content from guide data server 102.

As described above with respect to update blocking time 204, 214, error-handling may also occur during multicast blocking time 206, 216. One example of error-handling may include multicast server 110 being activated during multicast blocking time 206, 216. In one example, multicast server 110 may determine if multicast server 110 has any content stored in MS source database 114. For example, as described above, if multicast server 110 is activated for the first time, multicast server 110 may not have any content stored within MS source database 114. In this example, multicast server 110 may download content from guide data server 102.

Alternatively, multicast server 110 may determine that at least some content is stored in MS source database 114. In this example, multicast server 110 may determine if the content stored on MC source dB 114 is less up-to-date than the respective content stored in source data dB 104 within guide data server 102. If multicast server 110 determines that the content stored in MS source dB 114 is less up-to-date than the content stored in source data dB 104, multicast server 110 may request to download the more up-to-date content from source data dB 104 of guide data server 102. Thereafter, multicast server 110 may check guide data server 102 periodically (e.g., every x minutes, etc.) to determine whether guide data server 102 is storing content that is more up-to-date than the content stored on multicast server 110. Thus, in this example, multicast server 110 may only request content from guide data server 102 when guide data server 102 is storing content that is more up-to-date than the content stored on multicast server 110.

As indicated above, aspects of the devices (e.g., guide data server 102, multicast server 110, STB 130, etc.), and/or aspects of the functionality of devices found in system 100 may differ, depending on whether daylight savings time (DST) is occurring, or not occurring. FIGS. 2A, 2B depicts tables illustrating examples of the different times in which content will be downloaded from guide data server 102 to multicast server 110, depending on whether the processing is being performed during DST or non-DST. These times, depicted in FIGS. 2A, 2B, are for illustration purposes only. Each of the times, including the times for respective normal operating hours, update blocking time periods, and multicast blocking time periods, may vary from the times shown on FIGS. 2A, 2B.

In one example, FIG. 2A depicts time periods in which content is downloaded to multicast server during non-DST. In this example, normal operating hours 202 begins at 2:10 a.m. and ends at 11:54 p.m., update blocking time period 204 begins at 11:55 p.m. and ends at 1:49 p.m., and multicast blocking time period 206 begins at 1:50 a.m. and ends at 2:09 a.m. Thus, in this example, the aggregation of the three time periods depicted in FIG. 2A, FIG. 2A covers the twenty-four hour time period found in a single day.

Contrasting the above non-DST times, FIG. 2B shows the time periods in which multicast server 110 downloads content from guide data server 102 during DST. As shown in FIG. 2B, the begin times for normal operating hours 212 and multicast blocking time period 216 are one hour later than the times shown in FIG. 2A for the respective time periods relating to daylight savings time (DST). Further, as shown in FIGS. 2A, 2B, the end times for update blocking time 214 and multicast blocking time 216 are one hour later during DST than during non-DST (204, 206, respectively). As indicated above, however, the times, and time periods, provided in FIGS. 2A, 2B, and described throughout the disclosure, are for illustrations purposes only, and are not intended to be limiting.

As FIGS. 2A, 2B show, the example three time periods (i.e., normal operating hours, update blocking time period, multicast blocking time period) may be interdependent. Thus, in one example, modifying the time in which one time period begins or ends affects the time in which an abutting time period begins, or ends, respectively. For example, as shown in FIGS. 2A, 2B, the end of update blocking time period abuts the beginning of multicast blocking time period. During non-DST, for example, update blocking time period 204 ends at 1:49 a.m., and multicast blocking time period 204 begins at 1:50 a.m. If, in this example, the end time of update blocking time period is modified, the begin time of multicast blocking time period may also require modification. Thus, in examples in which the time periods are interdependent upon one another, if the begin time and/or end time of one time period is modified, a respective end time or begin time of an abutting time period may also need to be modified accordingly. Modifying the begin times and end times to account for modifications of abutting time periods in this way results in desired coverage of content transmission over a twenty-four hour period. The frequency of checking for content updates may be modified, for example, by manual adjustment (such as by a technician of system 100) or by automatic adjustment. In some examples, the frequency of updates may vary for different events or times of the year. For example, during sports playoffs events, the content is likely to be updated more frequently.

In addition to accounting for daylight savings time (DST), aspects of system 100 may include, and/or account for, devices (e.g., multicast servers 110, STB 130, etc.) being located across various time zones. Multicast server 110, for example, may be located in one time zone and provide content to STB 130 across numerous and varied time zones. In this example, STBs located across multiple time zones may have beginning and ending times for time periods (i.e., normal operating hours 202, 212, update blocking time period 204, 214, multicast blocking time period 206, 216, etc.) that are the same within each respective time zone. For example, STBs 130 located across multiple time zones may have the same normal operating hours, defined as the time period between 2:10 a.m. and 11:54 p.m., within each respective time zone. Because, in this example, the STBs 130 are located across multiple time zones, the defined times (e.g., 2:10 a.m. and 11:54 p.m.) within each time zone are different from one time zone to the next. For example, multicast server 110 may be located in the Eastern time zone and provide content to STB A (in the Eastern time zone), STB B (in the Pacific time zone), and STB C (in the Central time zone). In this example, the time periods (e.g., normal operating hours, update blocking time period, multicast blocking time period) will be as defined in FIGS. 2A, 2B for each respective time zone in which STB A, B, and C are located. Thus, in examples, the relevant time periods may be based on each respective time zone in which each STB 130 is located. In some examples, multicast server 110 includes a predefined configuration file which defines a mapping of STB regions to time zones. The mapping in the predefined configuration file may be used by multicast server 110 to account for devices located across various time zones.

Figure 3:
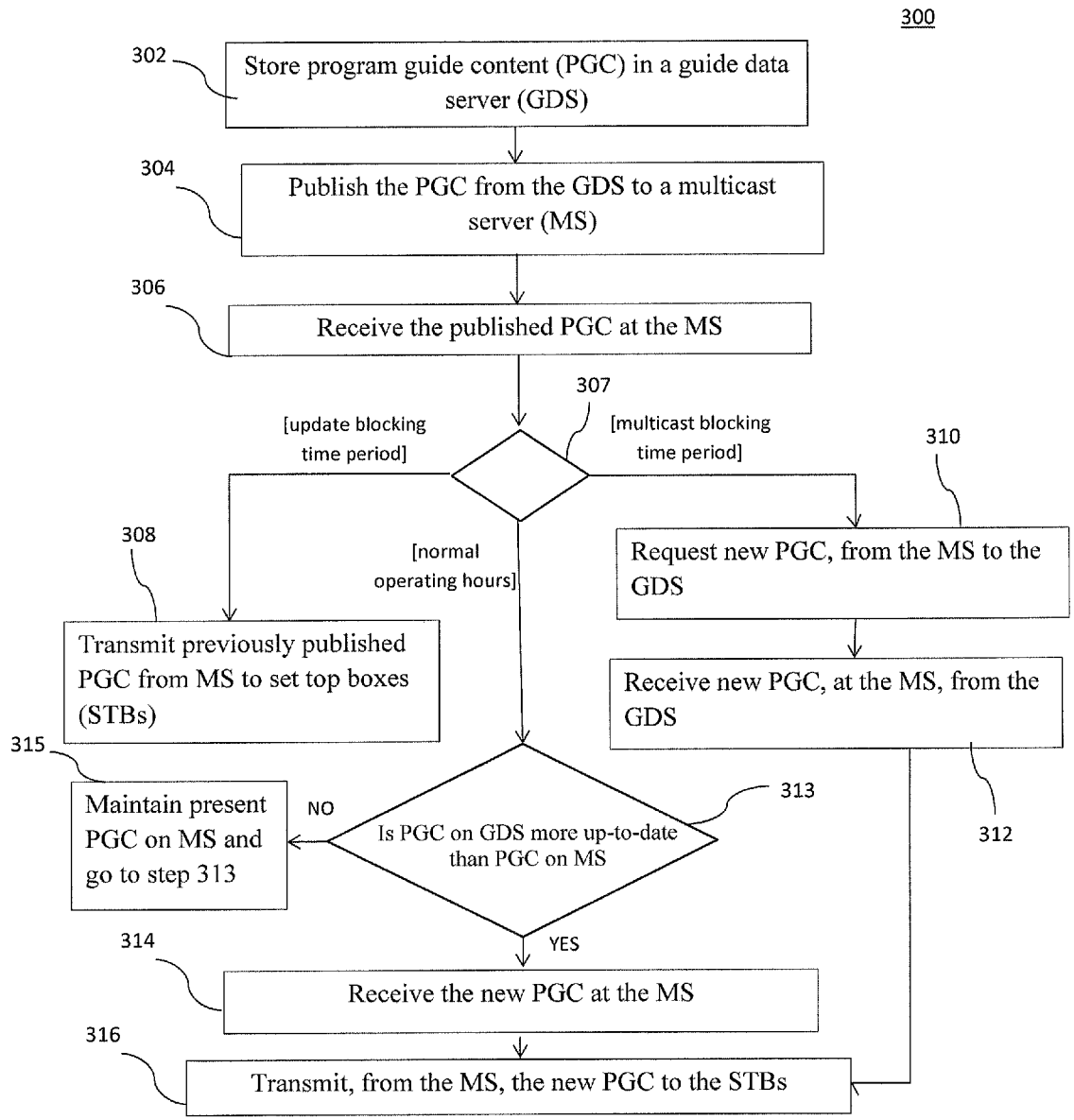
FIG. 3 is a flow diagram of an exemplary method for providing content to set top boxes, wherein the content is pushed from guide data server (GDS) to multicast server (MS), and from the MS to STBs.

A method of providing content among guide data server 102, multicast server 110, and STB 130, according to aspects described in the disclosure, is shown on FIG. 3. Method 300 begins with step 302, in which guide data server stores content. In examples, the content stored in guide data server may include IPG content. Next, step 302 includes guide data server publishing the stored content. Guide data server 102, for example, may publish the stored content directly to STB 130. In other examples, rather than transmit the content directly to STB 130, guide data server 130 may publish, or transmit, the content to multicast server 110. In these examples, multicast server 110 acts as a proxy to guide data server 102 for transmitting the content to STB 130.

In examples where multicast server 110 acts a proxy to guide data server 102, multicast server 110 receives the published content from guide data server 102, as illustrated in step 306. After step 306, it is determined, in step 307, what time period (e.g., normal operating hours, update blocking time period, multicast blocking time period) multicast server 110 is located. In examples in which STBs are located in different time zones than multicast server 110, the time periods are based on the time zone for the STBs located in each respective time zone. The time periods during non-daylight savings time (non-DST), for example, may include 2:10 a.m.-11:54 p.m. for normal operating hours; 11:55 p.m.-1:49 a.m. for update blocking time period; and 1:50 a.m.-2:09 a.m. for multicast blocking period. The time periods during DST may include 3:10 a.m.-11:54 p.m. for normal operating hours; 11:55 p.m.-2:49 a.m. for update blocking time period; and 2:50 a.m.-3:09 a.m. for multicast blocking period. Functionality of guide data server 102, multicast server 110, and STB 130 may be the same, within respective time zones, according to the relevant time periods. In some examples, the relevant time periods will be based on the time zone in which each STB 130 is located. In other examples, the relevant time periods may be based on the time zone in which the multicast server 110 is located.

During the update blocking time period, multicast server 110 proceeds from step 307 to step 308. Thus, during the update blocking time period, multicast server 110 transmits previously published content to STB 130.

Alternatively, during the multicast blocking time, multicast server 110 proceeds from step 307 to steps 310 and 312. Step 310 includes the multicast server 110 requesting new content from the guide data server 102. In examples, this request is a one-time request when the multicast blocking time begins. In other examples, this request is a request that can occur more than one time, e.g., according to a schedule. Step 312 includes the multicast server 110 receiving new content from the guide data server 102. According to step 312, multicast server 110 will determine the status (e.g., age) of the content stored on guide data server 102. For instance, multicast server 110 can use a time stamp associated with the content to determine the age of the content on guide data server 102. If the content on guide data server 102 is newer (e.g., more recent, more up-to-date) than the relevant content stored on multicast server 110, then multicast server 110 will request the more up-to-date content from guide data server 102.

Lastly, during normal operating hours, multicast server proceeds from step 307 to step 313. At step 313, it is determined whether the content on guide data server 102 is newer (e.g., more recent, more up-to-date) than the present content on multicast server 110. When it is determined that the content on guide data server 102 is newer, step 313 proceeds to steps 314 and 316. In preferred examples, normal operating hours begins after multicast blocking time period (and content refresh). Thus, guide data server should have the most up-to-date content at the beginning of normal operating hours. To obtain this most up-to-date content, multicast server according to step 314 performs a request of the new content from the guide data and receives the new content from the guide data server. After receiving the content from guide data server, the multicast server transmits the content to the STBs, according to step 316. In one example, the multicast server transmits the content to the STBs using the push frameworks, although other frameworks may be used alternatively, or in combination. At step 313, when it is determined that the content on guide data server 102 is not newer, step 313 proceeds to step 315. At step 315, the present content is maintained on multicast server 110, and step 315 proceeds to step 313.

A number of the procedures discussed above are implemented by appropriately configured servers, e.g. functioning as a multicast server and/or a guide data server. A server often is implemented in the form of server programming running on one or more network connected computers. Although special purpose hardware could be constructed, the computers of the server platforms typically utilize general purpose hardware.

Figure 4:
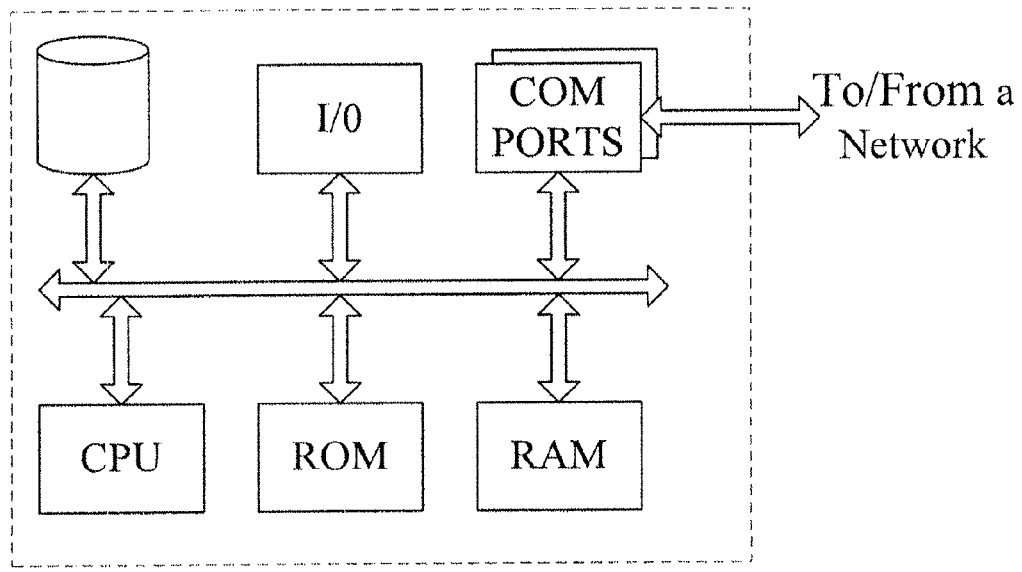
FIG. 4 is a simplified functional block diagram of a computer that may be configured as a host or server, for example, to function as a server for the guide data server (GDS) or multicast server (MS) of FIG. 1.
Figure 5:
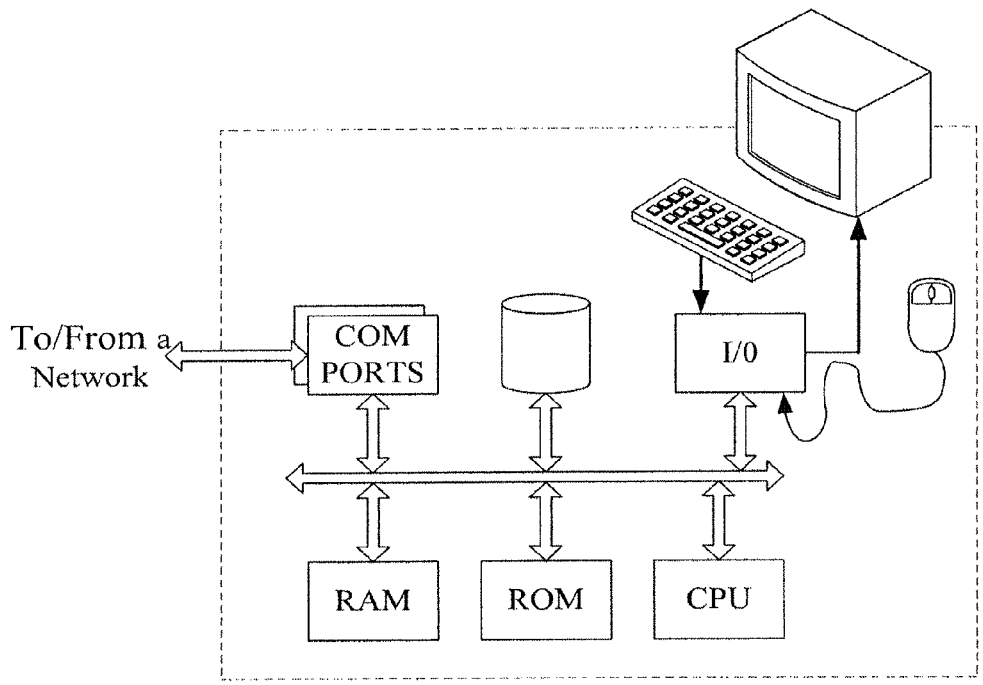
FIG. 5 is a simplified functional diagram of a personal computer or other work station or mobile device, such as the set top box (STB) of FIG. 1

FIGS. 4 and 5 provide functional block diagram illustrations of general purpose computer hardware platforms. FIG. 4 illustrates a network or host computer platform, as may be used to implement a server, such as the guide data server, multicast server, etc. in the examples discussed above. FIG. 5 depicts a computer with user interface elements, as may be used to implement a personal computer or other type of work station or terminal device, although the computer of FIG. 5 may also act as a server if appropriately programmed. The structure, programming and general operation of such computer equipment should be fairly well known; and as a result, these two drawings should be self-explanatory.

A computer for a server function, for example, includes a data communication interface for packet data communication. The server computer also includes a central processing unit (CPU), in the form of one or more processors, for executing program instructions. The server platform typically includes an internal communication bus, program storage and data storage for various data files to be processed and/or communicated by the server, although the server often receives programming and data via network communications. Of course, the server functions may be implemented in a distributed fashion on a number of similar computer platforms, to distribute the processing load.

Hence, aspects of the methods outlined above may be embodied in programming. Program aspects of the technology may be thought of as "products" or "articles of manufacture" typically in the form of executable code and/or associated data about various stations involved in the proximate device locator service that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software programming from a computer or processor into the server computer or into the STB, for example, from another computer of a video network operator. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible or non-transitory "storage" media, terms such as computer or machine "readable medium" refer to any medium that participates in providing instructions to a processor for execution.

Hence, a machine readable medium may take many forms, including but not limited to, a tangible storage medium, a carrier wave medium or a physical transmission medium. Non-volatile storage media include, for example, optical or magnetic disks, such as any of the storage devices in any computer(s) or the like, such as may be used to implement the information flow control, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions and/or associated list data to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed:
1. A system, comprising:
one or more computers having a memory;
a multicast server, implemented on the one or more computers;
a guide data server, implemented on the one or more computers, configured to store program guide content in the memory and transmit the stored program guide content to the multicast server;
the multicast server being configured to receive the program guide content from the guide data server, and transmit the program guide content to set top boxes according to at least three independent time periods that include an update blocking time period, a multicast blocking time period, and a normal time period,
wherein, the independent time periods are determined based on at least one time zone associated with the multicast server or at least one of the respective time zones associated with each of the set top boxes;
wherein the program guide content comprises:
a first program guide content that is transmitted by the guide data server to the multicast server prior to a predetermined time of day, and
a modified program guide content that is transmitted by the guide data server to the multicast server after the predetermined time of day;
wherein:
during the update blocking time period, the multicast server is further configured to transmit the first program guide content to the set top boxes;
during the multicast blocking time period, the multicast server is further configured to:
perform a one-time request for the modified program guide content from the guide data server, receive the modified program guide content from the guide data server, in response to the one-time request, when the modified program guide content is updated on the guide data server, receive the updated modified program guide content from the guide data server; and during the normal time period, the multicast server is further configured to:

receive the modified program guide content transmitted from the guide data server, and transmit the modified program guide content to the set top boxes.

2. The system of claim 1, wherein the multicast server is further configured to:

request the first program guide content from the guide data server when, during the update blocking time period, the multicast server is activated, and the multicast server is not storing the first program guide content.

3. The system of claim 1, wherein the multicast server is further configured to:

request the updated program guide content from the guide data server when, during the multicast blocking time period, the multicast server is activated, and the multicast server determines that the multicast server is not storing the updated program guide content, or the multicast server is storing present program guide content that is older than the updated program guide content stored on the guide data server.

4. The system of claim 1, wherein the multicast server is further configured to:

request the modified program guide content from the guide data server when, during the normal time period, the multicast server is activated, and the multicast server determines that the multicast server is storing present program guide content that is older than the modified program guide content stored in the guide data server.

5. The system of claim 1, wherein:

the set top boxes are located across multiple time zones; and the multicast server is further configured to transmit the program guide content to each of the set top boxes located across the multiple time zones at a same predefined time of day within each of the respective multiple time zones.

6. The system of claim 1, wherein:

the multicast server is further configured to adjust respective start and end times of the update blocking time period, the multicast blocking time period, and the normal time period, to account for daylight savings time.

7. The system of claim 1, wherein the multicast server is further configured to during the update blocking time period overlap with at least one of the multicast blocking time period or the normal time period.

8. method comprising:

storing, in a guide data server, program guide content in a memory;

transmitting, from the guide data server to a multicast server, the program guide content stored in the memory;

receiving, at the multicast server, the program guide content transmitted from the guide data server;

transmitting, from the multicast server to set top boxes, the received program guide content according to at least three independent time periods, including an update blocking time period, a multicast blocking time period, and a normal time period, wherein the at least three independent time periods are based on at least one time zone associated with the multicast server or at least one of the time zones associated with each of the set top boxes;

wherein the program guide content includes:

a first program guide content that is transmitted by the guide data server prior to a predetermined time of day, and a modified program guide content that is transmitted by the guide data server to the multicast server after the predetermined time of day;

wherein:

during the update blocking time period, transmitting, from the multicast server to the set top boxes, the first program guide content;

during the multicast blocking time period:

requesting, at the multicast server, the modified program guide content from the guide data server, receiving the requested modified program guide content when the modified program guide content is transmitted from the guide data server, and receiving updated modified program guide content from the guide data server when the modified program guide content is updated on the guide data server;

during the normal time period:

receiving, at the multicast server, the modified program guide content transmitted from the guide data server, and transmitting the modified program guide content from the multicast server to the set top boxes.

9. The method of claim 8, further comprising:

requesting, from the guide data server at the multicast server, the first program guide content when the multicast server is activated during the update blocking time and the activated multicast server is not storing the first program guide content.

10. The method of claim 8, further comprising:

requesting, from the guide data server at the multicast server, the modified program guide content when the multicast server is activated during the multicast blocking time period and it is determined that the multicast server is not storing the modified program guide content, or the multicast server is storing present program guide content that is older than the modified program guide content stored in the guide data server.

11. The method of claim 8, further comprising:

requesting, from the guide data server at the multicast server, the modified program guide content when the multicast server is activated during the normal time period and the multicast server is storing present program guide content that is older than the modified program guide content stored in the guide data server.

12. The method of claim 8, wherein:

the set top boxes are located across multiple time zones; and the method further comprises transmitting, at a same predefined time of day within each of the respective multiple time zones, the program guide content from the multicast server to each of the set top boxes positioned across the multiple time zones.

13. The method of claim 8, further comprising:
adjusting respective start and end times of the update blocking time period, the multicast blocking time period, and the normal time period, to account for daylight savings time.

14. A multicast server, comprising:
a memory;
a source database;
an input/output (I/O) interface configured to enable the multicast server to communicate with other devices; and
a processor configured to cause the multicast server to perform functions, including functions to:
receive program guide content transmitted from a guide data server, and transmit the received program guide content to set top boxes according to at least three independent time periods, the at least three independent time periods including an update blocking time period, a multicast blocking time period, and a normal time period,
determine whether the current time period is the update blocking time period, the multicast blocking time period, or the normal time period based on at least one time zone associated with the multicast server or the other devices,
wherein the received program guide content includes:
a first program guide content that is transmitted by the guide data server prior to a predetermined time of day, and
a modified program guide content that is transmitted by the guide data server after the predetermined time of day;
wherein:
during the update blocking time period, the multicast server transmits the the first program guide content to the set top boxes;
during the multicast blocking time period, the multicast server:
performs a request for the modified program guide content from the guide data server,
receives the requested modified program guide content from the guide data server, and
when the modified program guide content is updated on the guide data server and transmitted from the guide data server, receives the updated modified program guide content from the guide data server; and
during the normal time period, the multicast server:
receives the modified program guide content transmitted from the guide data server; and
transmits the modified program guide content to the set top boxes.

15. The multicast server of claim 14, wherein:
the processor is further configured to enable multicast server to request the first program guide content from the guide data server when, during the update blocking time period, the multicast server is activated, and the multicast server is not storing the first program guide content.

16. The multicast server of claim 14, wherein:
the processor is further configured to enable the multicast server to request the modified program guide content from the guide data server when, during the multicast blocking time period, the multicast server is activated, and the multicast server determines that the multicast server is not storing the modified program guide content, or the multicast server is storing present program guide content that is older than the modified program guide content stored on the guide data server.

17. The multicast server of claim 14, wherein:
the processor is further configured to enable the multicast server to request the modified program guide content from the guide data server when, during the normal time period, the multicast server is activated, and the multicast server determines that the multicast server is storing present program guide content that is older than the modified program guide content stored in the guide data server.

18. The multicast server of claim 14, wherein:
the set top boxes are located across multiple time zones; and
the processor is further configured to transmit, at a same predefined time of day within each of the respective multiple time zones, the program guide content from the multicast server to each of the set top boxes positioned across the multiple time zones.

19. The multicast server of claim 14, wherein:
the processor is further configured to adjust respective start and end times of the update blocking time period, the multicast blocking time period, and the normal time period, to account for daylight savings time.

20. The multicast server of claim 14, wherein: the update blocking time
period, overlaps with at least one of the multicast blocking time period or the normal time period.

* * * * *